April 7, 1925.  G. E. O'HEARN  1,532,337

BABY CARRIAGE BODY

Filed May 11, 1923

Inventor:
George E. O'Hearn
By Geo. H. Kennedy Jr.
Attorney

Patented Apr. 7, 1925.

1,532,337

UNITED STATES PATENT OFFICE.

GEORGE E. O'HEARN, OF GARDNER, MASSACHUSETTS, ASSIGNOR TO O'HEARN MANUFACTURING COMPANY, OF GARDNER, MASSACHUSETTS, A CORPORATION OF MASSACHUSETTS.

BABY-CARRIAGE BODY.

Application filed May 11, 1923. Serial No. 638,262.

*To all whom it may concern:*

Be it known that I, GEORGE E. O'HEARN, a citizen of the United States, residing at Gardner, in the county of Worcester and Commonwealth of Massachusetts, have invented a new and useful Improvement in a Baby-Carriage Body, of which the following, together with the accompanying drawings, is a specification.

The present invention relates to baby carriages, and in particular involves an improved construction of baby carriage body. The invention resides in the novel combination and arrangement of parts hereinafter set forth, reference being had to the accompanying drawings, in which—

Like reference characters refer to like parts in the different figures.

Figure 1:
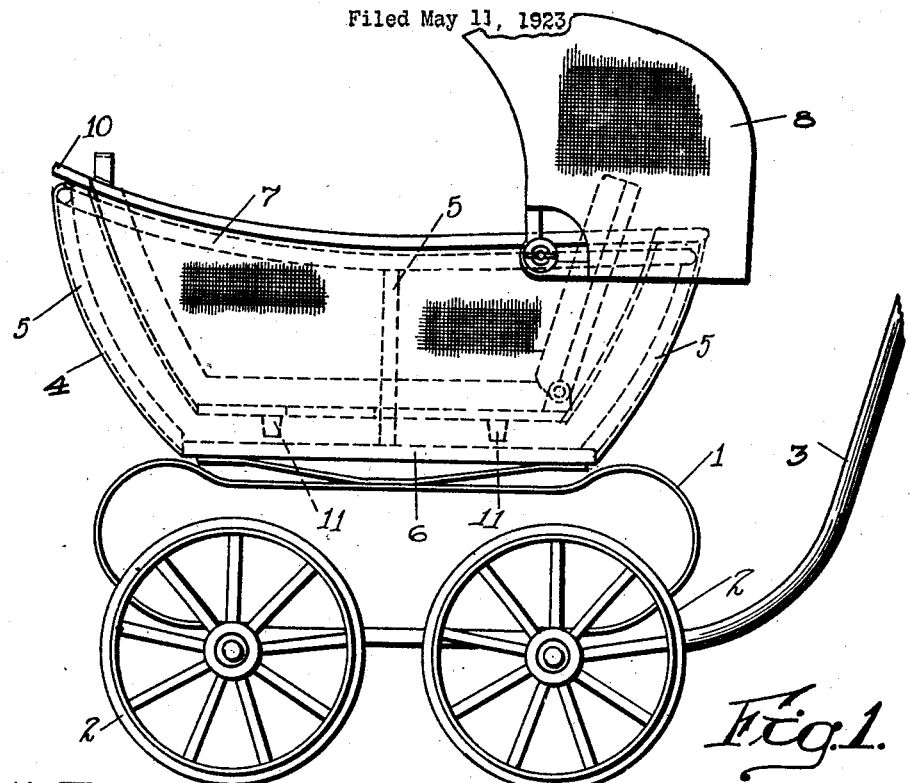
Fig. 1 is a side elevation of a baby carriage embodying the invention.

As here shown, the invention is applied to a baby carriage of conventional form, the same comprising the usual spring framework 1, mounted on wheels 2, 2, and providing the usual handle 3 by which the vehicle may be pushed or drawn. The spring framework 1 supports a body or shell 4, the latter being preferably of the usual rectangular basket or receptacle contour, and having side and end walls of woven reed or similar fabric, secured in place by suitable attachment to interior vertical frame members 5, 5, rising from a bottom 6, and also to a top frame member or members 7, the latter connecting the upper ends of the vertical members 5, 5 and constituting, in effect, an inturned rim for most of the perimeter of the shell or body 4. The latter, as is customary in baby carriage construction, is equipped at one end with a hood 8, which is adjustable both angularly and longitudinally to shield the occupant of the carriage as much or as little as may be desired.

Figure 2:
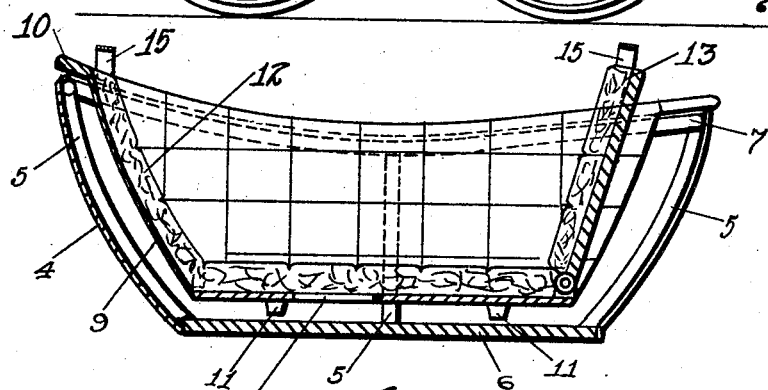
Fig. 2 is a sectional view of the body of such carriage.

Associated with the outer shell 4 of the vehicle, is an inner shell or basket 9 of woven reed fabric, or similar material, said inner shell being preferably of the same general contour as the outer shell, but somewhat smaller and shallower. Said inner shell 9 has an outturned rim or flange 10, adapted to cooperate with the inturned rim of the outer shell in securing the suspension and support of said inner shell within the vehicle,—such suspension and support, as illustrated in Fig. 2, involving a sufficient spacing between the bottoms of the respective shells 4 and 9 to accommodate the supporting legs or feet 11, 11 with which the shell or basket 9 is equipped. Said inner shell or basket 9 is preferably provided with the usual interior padding or upholstery 12, and also, at one end, with an angularly adjustable back rest 13; when the latter is adjusted to maintain the child in sitting posture, the space between the shells 4 and 9 is available for the comfortable accommodation of the lower limbs and feet of the child, by projection through a well opening 14 in the bottom of shell 9.

The construction above described is extremely useful in that it combines and coordinates the functions of a baby carriage with those of a sleeping basket or bassinet, since the interior shell 9, which for all practical purposes constitutes the body of the carriage, is readily removable therefrom without need for any dismantling or disturbance whatsoever,—said inner shell 9 being preferably equipped for this purpose with handles 15, 15 at each end, which permit it to be seized and lifted out of the outer shell 4, with the utmost facility. This capability especially adapts the above described construction of vehicle to the needs of young infants, since it makes it possible for the infant, while sleeping, to be placed in or removed from the carriage without any actual handling, such as would tend to disturb the sleep. When removed from the carriage the inner shell 9 serves all the functions and has all the advantages of the sleeping baskets or bassinets now in general use for small infants,—the legs or feet 11, 11 of said inner shell providing a firm support therefor on the floor or on some article of furniture. In the use of the vehicle with the inner shell 9, the space between the two shells 4 and 9 serves as a convenient repository for bundles, parcels, and the like, and when the child has outgrown the use of said inner shell, the main body of the carriage, being larger, is in all respects suitable for use, the same as any ordinary child's carriage, simply by providing cushions or upholstery therein.

I claim:

In a baby carriage, a rigid body having a rigid rim, a removable rigid inner shell having an outturned rigid rim for suspending said inner shell in said body without contact between the bottom of said inner shell and the said body, supporting members on the bottom of said inner shell so that it may rest on a surface when removed from the said body without contact between the bottom of said shell and said surface, and a well opening in said inner shell for the projection of an occupant's feet thereinto.

Dated this second day of May, 1923.

GEORGE E. O'HEARN.